(12) United States Patent
Allen et al.

(10) Patent No.: US 7,593,689 B2
(45) Date of Patent: Sep. 22, 2009

(54) METHOD FOR DETECTING AN OSCILLATION IN AN ON-FREQUENCY REPEATER

(75) Inventors: Steve Allen, Nepean (CA); Marc Colledan, Ottawa (CA); Mike Roper, legal representative, Kemptville (CA)

(73) Assignee: Spotwave Wireless Inc.

( * ) Notice: Subject to any disclaimer, the term of this patent is extended or adjusted under 35 U.S.C. 154(b) by 558 days.

(21) Appl. No.: 10/941,869

(22) Filed: Sep. 16, 2004

(65) Prior Publication Data

US 2005/0118949 A1 Jun. 2, 2005

Related U.S. Application Data

(60) Provisional application No. 60/502,949, filed on Sep. 16, 2003.

(51) Int. Cl.
*H04B 3/36* (2006.01)
(52) U.S. Cl. ............... 455/7; 455/63.1; 455/67.11; 455/67.13; 375/211; 375/213; 370/315
(58) Field of Classification Search ............ 455/7–11.1, 455/14–25, 63.1, 67.11, 67.13; 370/315; 375/211, 213
See application file for complete search history.

(56) References Cited

U.S. PATENT DOCUMENTS

| 4,383,331 | A | | 5/1983 | Davidson |
| 4,475,243 | A | | 10/1984 | Batlivala et al. |
| 4,701,935 | A | | 10/1987 | Namiki |
| 4,789,993 | A | | 12/1988 | Ryu |
| 4,794,649 | A | * | 12/1988 | Fujiwara ................. 455/9 |
| 5,125,108 | A | | 6/1992 | Talwar |
| 5,584,065 | A | | 12/1996 | Monzello |
| 6,493,537 | B1 | * | 12/2002 | Ogawa ................. 455/9 |
| 6,748,194 | B2 | * | 6/2004 | Oh et al. ............... 455/11.1 |

* cited by examiner

*Primary Examiner*—Raymond S Dean
(74) *Attorney, Agent, or Firm*—Marshall, Gerstein & Borun LLP

(57) ABSTRACT

A method of detecting oscillation in an on-frequency repeater having an RF signal path coupled between an input antenna and an output antenna. In accordance with the present invention, a first RF signal power level within the RF signal path is detected during an un-muted period in which transmission of an output RF signal through the output antenna is enabled. A second RF signal power level within the RF signal path is detected during a mute period in which transmission of an RF signal through the output antenna is disabled. The first and second detected RF signal power levels are then compared, which provides an indication of signal leakage, and thus oscillation.

15 Claims, 2 Drawing Sheets

METHOD FOR DETECTING AN OSCILLATION IN AN ON-FREQUENCY REPEATER

CROSS-REFERENCE TO RELATED APPLICATIONS

This is application is a continuation in part of U.S. patent application Ser. No. 60/502,949 filed on Sep. 16, 2003.

BACKGROUND OF THE INVENTION

The use of wireless repeaters to extend the coverage area of a wireless network, or to improve service quality within specific areas, are well known. A typical application of repeaters is for improving wireless services within defined regions of a wireless network, where signal levels would otherwise be too low for satisfactory quality of service. For example, within a building, or a built-up urban area, signal attenuation, shadowing by buildings and/or hills; noise generated by various radio frequency sources, and multi-path effects can seriously degrade the quality of desired RF signals. In some cases, a wireless network provider may install a repeater in order to improve service in a region lying at an edge of the coverage area serviced by a base station, thereby effectively extending the reach of the base-station.

On-frequency repeaters are known in the art, for amplifying an input signal without otherwise altering its frequency spectrum. In some cases, an on-frequency repeater may also employ various types of active circuitry in order to enhance the signal-to-noise (S/N) ratio, in addition to simply increasing the power level. On-frequency repeaters are characterized by the fact that the input and output signals (in either the uplink or downlink path directions) have the same frequency. For the purposes of the present invention, the term "on-frequency repeater" shall be understood to refer to any amplifier system that has this characteristic, irrespective of whether the system is used as part of an wireless communications network, or in any other context.

The external input signal received by the repeater (e.g. from a base station or a subscriber's wireless communications device—WCD) can be represented by:

$$Se = A \cdot Cos(\omega t + m(t)) \quad (1)$$

Where A is the peak amplitude of the external input signal, $\omega_i$ is the carrier frequency and m(t) is the (frequency) modulation applied to the external input signal. For the particular case of an on-frequency repeater, the corresponding output signal radiated by the repeater can be represented by:

$$So = G \cdot A \cdot Cos(\omega(t-\delta) + m(t-\delta)) \quad (2)$$

Where G is the repeater gain and δ is the time delay through the repeater at the carrier frequency ω.

It will be seen that the output signal (So) radiated by the repeater is a replica of the input signal received by the repeater, that has been amplified and subject to a time delay δ due to electrical delays within the repeater. This delay is partly inherent to the amplification process, but it is primarily caused by band-pass filters used in the repeater to prevent the unwanted amplification of signals outside the frequency band of interest. Generally the magnitude of the delay is inversely proportional to the bandwidth of the filters. The repeater gain (G) provides the increase in signal level that makes the repeater useful.

A limitation of on-frequency repeaters is that the output signal (So) can feed back to the repeater input via a so-called "leakage path". This feedback signal, which is present at the repeater's input antenna, is then:

$$Sf = \left(\frac{G \cdot A}{L}\right) \cdot Cos(\omega(t-\delta-\Delta) + m(t-\delta-\Delta)) \quad (3)$$

Where L is the signal loss in the feedback path (that is, the antenna isolation), and Δ is the time delay in the feedback path at the carrier frequency ω.

It will be seen that, if the modulation rate is slow compared to $$\frac{1}{(\delta + \Delta)},$$

the feedback signal appears as a phase-shifted version of the external input signal (Se). Consequently, as long as $$\left(\frac{G \cdot A}{L}\right) \ll 1,$$

the resulting input signal (Si) received by the repeater will be the vector sum of the external input signal Se (Equ. 1) and the feedback signal Sf (Equ. 3). The magnitude of the input signal (Si) is a function of both the amplitude of the external input signal (Se) and the feedback signal Sf, and their relative phases. For a repeater system that employs automatic gain control, the magnitude of the output signal (So), and thus the feedback signal (Sf), will be held approximately constant over a wide range of input power. Such a system will remain stable if the feedback signal Sf is always smaller than the input signal (Se).

However, if the system gain (G) becomes too high, so that Sf≧Se, then signal leakage between the output and input antennas will cause system oscillation. In principle, system stability can be obtained by ensuring that antenna isolation (L) is equal to or greater than the system gain (G). However, in practice, antenna isolation is difficult to predict, and will frequently change over time. Accordingly, conventional on-frequency repeater gain is manually adjusted by a technician to be less than the expected antenna isolation by a significant margin, in order to provide conditional stability in a changing RF environment. This margin significantly decreases the effectiveness of the repeater and yet does not prevent oscillation for all potential RF environments.

Various systems have been proposed for dynamically monitoring antenna isolation to control or prevent repeater oscillation.

For example, U.S. Pat. Nos. 5,125,108 and 5,584,065 disclose methods of removing interfering signals that are present along with a desired communications signal traffic, using a sample of the interfering signal received by a separate, auxiliary antenna. In these references, adaptive techniques are employed to adjust the amplitude and phase of the sample so that, when it is combined with the output of the communication system's receiving antenna, the interfering signal is cancelled.

U.S. Pat. No. 4,475,243 describes an apparatus for minimizing the "spillover" signal from the transmitter to the receiver in a repeater. In this reference, the received signal is translated to baseband (i.e., the carrier is removed) for amplification (regeneration), then translated back up to the same carrier frequency (i.e., remodulating a carrier) for retransmission. An "injection signal" based on sampling the regenerated communication signal is used in conjunction with mixing and correlation techniques to isolate the spillover component of the input signal so that it can be removed at an intermediate frequency (IF) stage of the receiver. This system is designed to handle a single communication signal with narrowband analog voice modulation, and thus is not suitable for use with broadband signal traffic carrying multiple parallel communication signals.

Furthermore, in U.S. Pat. Nos. 4,701,935 and 4,789,993, a digital microwave radio repeater is described in which the desired digital signal is a single signal and is regenerated (amplified) at baseband. In these references, the transmitter-to-receiver coupled interference component that appears at baseband is canceled by subtracting an estimated baseband interference signal. The estimated baseband interference signal is produced by means of an equalization technique implemented by transversal filters whose characteristics are adaptively determined.

U.S. Pat. No. 4,383,331 teaches a system in which a "tag", in the form of one or more side-frequencies, is added to the output signal prior to its retransmission. The detection of the tag in a received input signal allows the power level of the feed back signal to be measured, and this information allows the repeater to subtract out the interference. In principle, this technique could be applied to monitor antenna isolation in a repeater operating in a broadband RF environment. However, it suffers the limitation that the tag must be located in a side-band (i.e., lying above or below the bandwidth of the desired communications signal traffic) in order to avoid interference corrupting the desired communications signal traffic and/or interfering with other network components. Because antenna isolation can vary strongly with frequency, measurements based on side-band "tags" can, at best, provide only an rough approximation of the antenna isolation at the frequencies of the desired communications signal traffic.

U.S. Pat. No. 5,835,848, teaches a repeater in which antenna isolation is determined using a calibration procedure that is executed during periods in which no communications traffic is present. The calibration procedure involves opening a switch to prevent transmission of signals received at the input antenna; transmitting a test (pilot) signal from the output antenna; and then detecting the signal power of the test signal received through the input antenna. With this scheme, the test signal can be transmitted at any desired frequency, so it is possible to measure antenna isolation, as a function of frequency, across the entire operating bandwidth of the communications traffic. However, in order to accomplish this, there must be no communications signal traffic during the calibration procedure. This necessarily requires interruption of the communications signal traffic, which is highly undesirable.

The systems of U.S. Pat. Nos. 4,383,331 and 5,835,848 suffer the further disadvantage that, in most cases, the power level of the received test (pilot or tag) signal will be very low, requiring highly sensitive detection circuitry to successfully monitor. However, this high sensitivity renders the detection circuit vulnerable to radio frequency interference (RFI) emitted by many common electronic devices and/or test signals transmitted by other repeaters. The presence of noise at the same frequency as the test signal can easily render the system incapable of accurately detecting antenna isolation, and in fact may disable the repeater entirely.

Applicant's co-pending U.S. patent application Ser. No. 09/919,888 proposes a solution in which a unique bit-sequence is encoded as a signature signal that is transmitted through an output antenna as a low-level fade impressed on a broadband RF signal. The signal received through the input antenna is correlated with the bit-sequence, and the degree of correlation used as an indirect indicator of system stability. Impressing the signature signal onto the broadband RF signal (i.e., the desired communications signal traffic) as a low-level fade allows the system stability to continuously monitored without interfering with the communications signal traffic of other devices within the network. The use of a unique bit-sequence to generate the signature signal effectively ensures that the system can readily distinguish between noise (both random RFI and test and/or signature signals from other repeaters) and its own signature signal. However, accurate correlation between the received signal and the bit-sequence is computationally intensive. In some cases, a simpler solution is desired, without sacrificing the ability to detect leakage and prevent oscillation.

Another limitation of repeaters is that the repeater is always "on". This feature is necessary in order to ensure that, for example, a subscriber within the coverage area of the repeater can always access establish a connection with the base station. However, it also implies that the input signal Si received by the input antenna is amplified by the repeater and transmitted through the output antenna, even when no signals from mobile stations are present (i.e. Se=0). In the uplink path, this means that random RFI within the coverage area is amplified and radiated toward the base station, which increases the noise environment of the base station.

Low cost techniques for overcoming the above limitations of the prior art remain highly desirable.

SUMMARY OF THE INVENTION

Accordingly, an object of the present invention is to provide low-cost methods and systems for detecting and controlling oscillation of an on-frequency repeater.

A further object of the present invention is to provide low-cost methods and systems for preventing radiation of spurious signals by a repeater.

A first aspect of the present invention provides a method of detecting oscillation in an on-frequency repeater having an RF signal path coupled between an input antenna and an output antenna. In accordance with the present invention, a first RF signal power level within the RF signal path is detected during an un-muted period in which transmission of an output RF signal through the output antenna is enabled. A second RF signal power level within the RF signal path is detected during a mute period in which transmission of an RF signal through the output antenna is disabled. The first and second detected RF signal power levels are then compared, which provides an indication of signal leakage, and thus oscillation.

A second aspect of the present invention provides a method of controlling oscillation in an on-frequency repeater having an RF signal path coupled between an input antenna and an output antenna. In accordance with the present invention, a first RF signal power level within the RF signal path is detected during an un-muted period in which transmission of an output RF signal through the output antenna is enabled. A second RF signal power level within the RF signal path is detected during a mute period in which transmission of an RF signal through the output antenna is disabled. The first and second detected RF signal power levels are then compared, and a gain of the RF signal path adjusted based on the comparison result.

A third aspect of the present invention provides a method of reducing interference at a base station of wireless network having at least one mobile station within a coverage area of a repeater functionally interposed between the base station and the mobile station, in which the repeater operates to receive and amplify uplink RF signals from the mobile station and to transmit the amplified uplink RF signals to the base station. In accordance with the present invention, an absence of uplink RF signals from any of the mobile stations is detected. Transmission of the amplified RF signals by the repeater is muted in response to the detected absence of signals. By this arrangement, transmission of spurious signals and noise by the repeater is prevented.

A further aspect of the present invention provides a method of detecting a presence of uplink RF signals transmitted by any one or more mobile stations within the coverage area of a repeater functionally interposed between the mobile station(s) and a base station of a wireless network, in which the repeater operates to receive and amplify uplink RF signals from the mobile station and to transmit the amplified uplink RF signals to the base station. In accordance with the present invention, an RF signal power level within an RF signal path of the repeater is detected during a mute period in which transmission of amplified uplink RF signals to the base station is disabled. The detected RF signal power level is then compared to a predetermined threshold.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The following description utilizes exemplary power levels, power ranges, channel frequencies and band-widths in order to illustrate various features of the present invention. Those skilled in the art will appreciate, however, that the present invention is by no means limited to such values. On the contrary, those skilled in the art will readily understand that the present invention can be deployed for use in conjunction with any wireless communications network, and it is to be expected that the power levels, power ranges, channel frequencies, and band-widths stated herein will be modified to conform to the requirements of the communications network in question. Such modifications are considered to be well within the purview of those of ordinary skill in the art, and lie within the intended scope of the appended claims.

Figure 1:
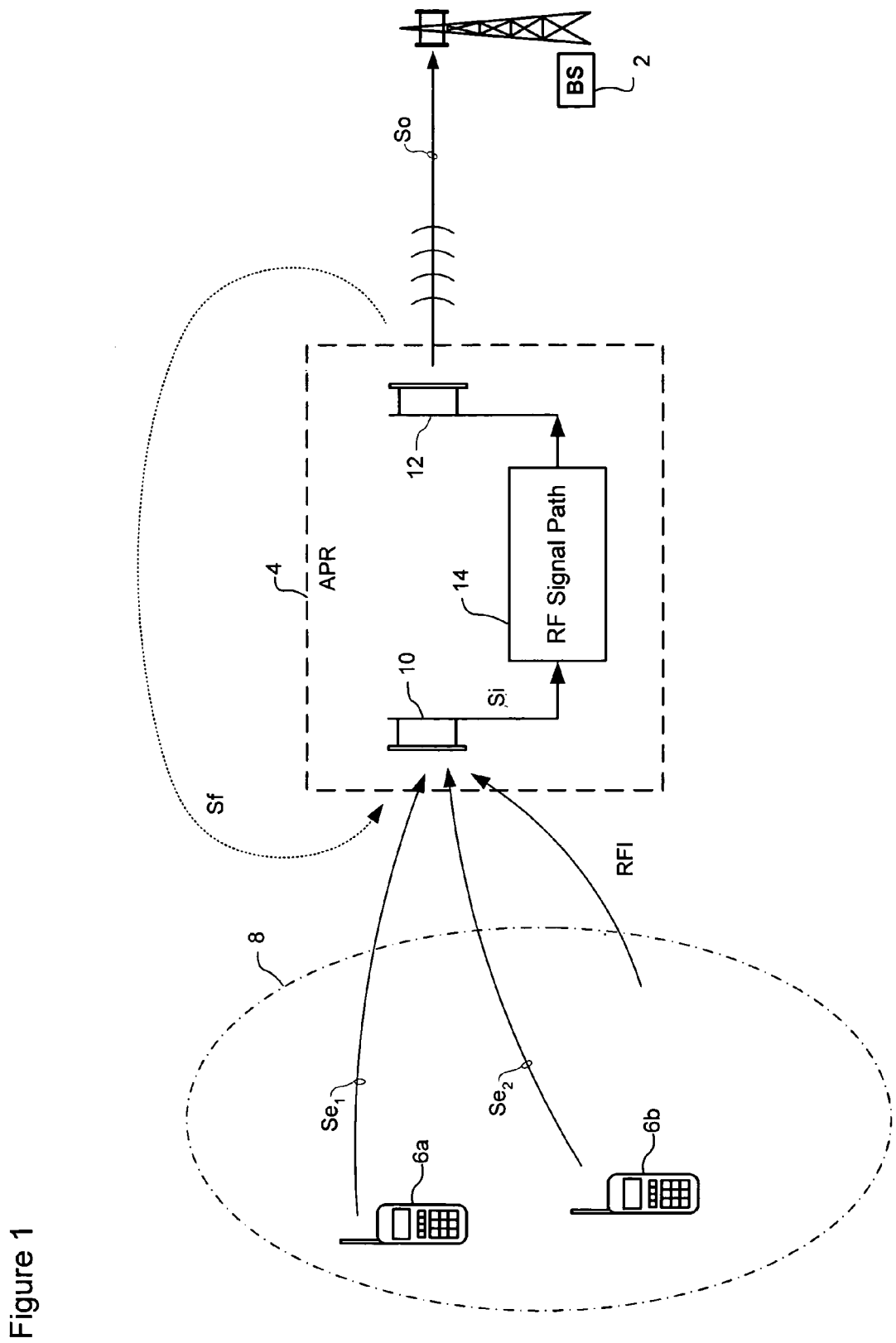
FIG. 1 is a block diagram schematically illustrating a representative wireless network in which the present invention may be deployed.

The present invention provides a system and method for detecting oscillation in an on-frequency repeater. FIG. 1 is a block diagram schematically illustrating a representative wireless network in which the present invention may be deployed.

As shown in FIG. 1, the wireless network generally comprises a base station (BS) 2, a repeater 4, and one or more mobile stations 6 within the coverage area 8 of the repeater.

The repeater 4 receives and controls (i.e., amplifies and/or attenuates) RF signal traffic between the base and mobile stations 2 and 6. In the case of an on-frequency repeater, this operation is preferably performed without signal formatting changes or protocol conversion, thereby rendering the repeater 4 transparent to both the fixed station 2 and the mobile stations 6. The base station 2 may, for example, be a cell site of the type commonly used in cellular communications networks. The mobile stations 6 may take the form of any conventional wireless communications device, such as, for example, Personal Digital Assistants (PDA's), wireless telephone handsets, pagers, and one and two-way wireless messaging devices.

It will be appreciated that multiple mobile stations 6 may be located within the coverage area of the repeater 2. However, for ease of description of the invention, only two mobile stations 6 are shown.

In the embodiment of FIG. 1, the repeater 4 comprises an input antenna 10 for receiving an input signal Si; an output antenna 12 for radiating an output signal (So) to the fixed station 2; and an RF signal path 14 coupled between the input and output antennas 10 and 12 in order to amplify the input signal (Si) for retransmission as the output signal (So). If desired, the signal path 14 may include an Intermediate Frequency (IF) section (not shown) to facilitate filtering, amplification, and other signal processing functions.

As may be seen in FIG. 1, the received input signal Si will inherently be a composite signal composed of the vector sum of the respective uplink signals $Se_i$ ($0 \leq i \leq n$) from each mobile station 6 within the coverage area 8; leakage signals Sf from the output antenna 12, and random radio frequency interference (RFI) within the coverage area 8 of the repeater 4. This composite input signal Si is amplified by the RF signal path 14 and radiated through the output antenna 12 as the output signal So.

In general, the bandwidth of the signal path 14 will be selected to encompass the range of frequencies that are expected to be used by the communications network within which the repeater 4 will operate. For example, in North America, publicly accessible Advanced Mobile Phone Service (AMPS) and Time Division Multiple Access (TDMA) cellular communications networks typically utilize a 25 MHz uplink and downlink path bandwidth centered on 836.5 MHz and 881.5 MHz, respectively. Glogal System for Mobile Communications (GSM) and Code Division Multiple Access (CDMA) networks utilize respective different bands, each having known bandwidth and center frequencies. In some cases, it will be desirable to make the bandwidth of the signal path 14 broad enough to encompass traffic of multiple different networks. In such cases, the signal path 14 may have a bandwidth of 60 MHz, or more, and carry any one or more of AMPS/TDMA, GSM, CDMA and other traffic types.

Figure 2:
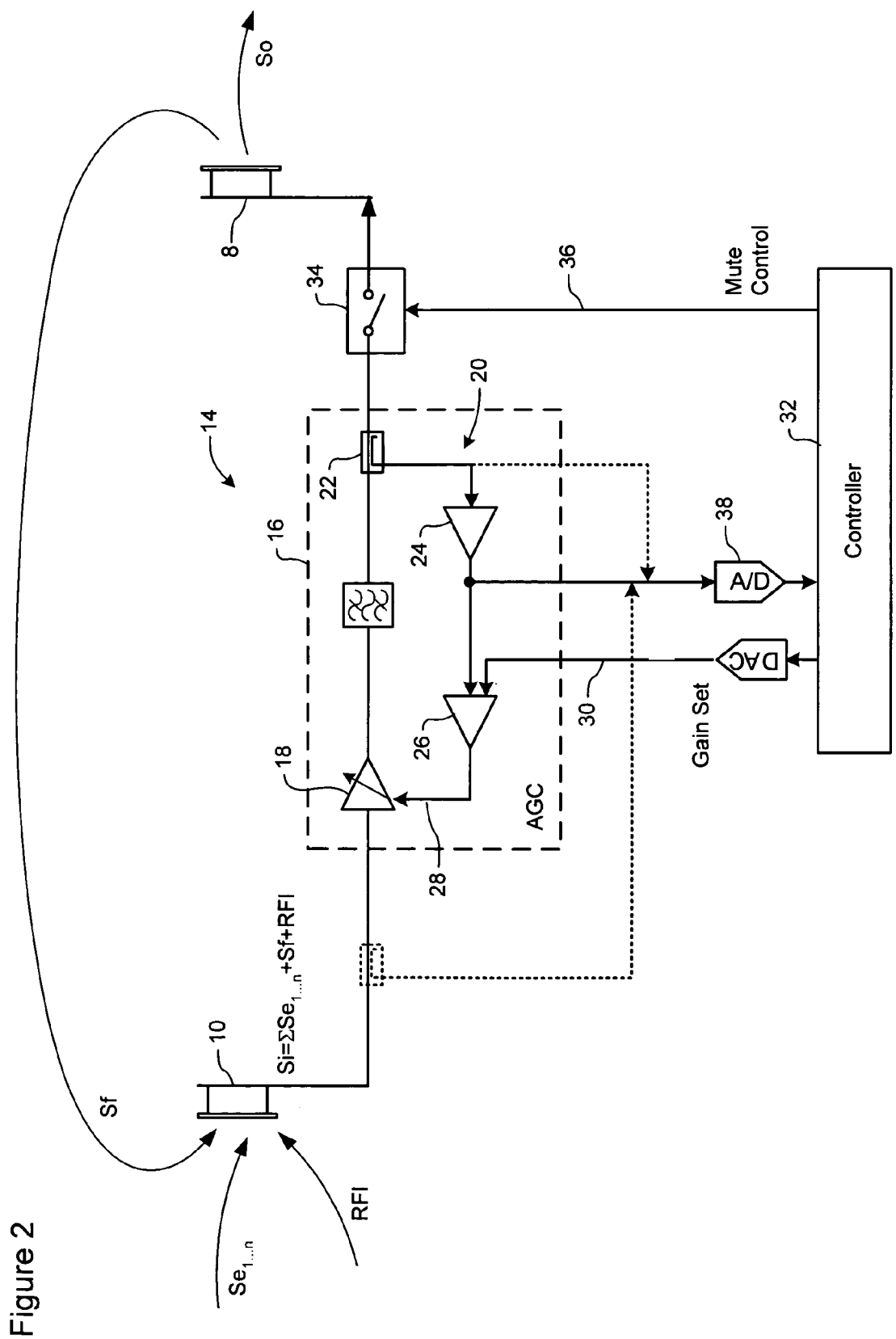
FIG. 2 is a block diagram schematically illustrating principle elements of a repeater in accordance with an embodiment of the present invention.

As shown in FIG. 2, the RF signal path 14 includes an Automatic Gain Control AGC loop 16 comprising a Variable Gain Amplifier (VGA) 18 and a feedback path 20 comprising a directional coupler 22, a logarithmic amplifier 24 and an integrator 26 which generates a gain control signal 28. The directional coupler 22, which may be a conventional 17 dB coupler, samples the signal path 14 at the VGA output, and supplies the sample signal to the log amp 24. The log amplifier 24, which may be cascaded with one or more fixed gain amplifiers (not shown), operates to control the gain of the feedback path 20 in a manner known in the art. The integrator 26 is preferably a conventional integrating amplifier, in which the inverting (−) input is connected to the output of the log amplifier 24. The non-inverting (+) input of the integrating amplifier 26 is coupled to receive a gain set signal 30 from a controller 32 (described below) via a Digital-to-Analog Converter (DAC). The output of the integrator 26 is supplied to the VGA 18 as the gain control signal 28, and the narrowband receiver 18.

With this arrangement, an increase in the signal power at the output of the VGA 18 will tend to cause the log amplifier 24 output to increase. With the gain set signal 30 from the controller 32 held constant, this would cause the gain control signal 28 appearing at the integrator output to decrease, thereby lowering the gain of the VGA 18 (and thus the broadband signal path 14). Those of ordinary skill in the art will recognize that this operation (that is, with the gain set signal 30 held constant) is substantially equivalent to conventional AGC operation.

FIG. 2 shows a single RF signal path 14 coupled between the input antenna 10 and output antenna 12. This arrangement carries unidirectional uplink RF signal traffic from mobile stations 6 within the coverage area 8 to the base station 2. Bi-directional signal traffic through the repeater 4, in order to convey downlink signal traffic from the base station 2 to the mobile stations 6, can readily be accommodated by mirroring the system of FIG. 2, or by coupling respective uplink and downlink signal paths between the two antennas 10 and 12 via diplexers. Both of these solutions are well known in the art, and accordingly will not be described in greater detail herein.

In general, oscillation detection in accordance with the present invention is accomplished by temporarily muting transmission of the output signal So from the output antenna 12, and comparing respective power levels within the signal path 14 during muted and un-muted periods. With this arrangement, the difference between the respective "muted" and "un-muted" power levels is indicative of the strength of the leakage signal Sf in the received input signal Si, and thus an indicator of oscillation.

In the embodiment of FIG. 2, muting of the output signal So is accomplished by means of an RF switch 34 controlled by a mute control signal 36 generated by the controller unit 32. Other means well known in the art may be employed for this purpose. As may be appreciated, power levels within the signal path 14 can be monitored at any suitable point upstream of the RF switch 34. In the embodiment of FIG. 2, power levels are monitored within the AGC feedback path 20 at the output of the log amplifier 24, which is tapped and supplied to the controller unit 32 via an analog-to-digital (A/D) converter 38. This is advantageous because the feedback path signal at this point is highly sensitive to changes in the power level of the input signal Si, and thus will rapidly respond to input signal power changes due to muting and un-muting of the output signal So. However, the power level can be obtained from other locations within the RF signal path 14, as indicated by the dotted lines in FIG. 2.

In operation, the controller unit 32 operates under software control to maintain the RF switch 34 in a "closed" condition, so that the output signal So is transmitted normally from the output antenna 12. During this un-muted operation, the RF signal power is sampled by the controller 32 and the respective "un-muted" power level stored. The RF switch 34 is then temporarily "opened" to interrupt transmission of the output signal So. During this muted period, the signal power is again sampled by the controller 32, to obtain a corresponding "muted" power level.

If the muted and un-muted power levels are significantly different, then some or all of the power received by the input antenna 10 must necessarily have been received from the output antenna 12, via the leakage path. For example, a situation in which the muted power level is approximately half the un-muted power level implies that the aggregate uplink signal $$\sum_{i=1}^{n} Se_i$$

from all transmitting mobile stations 6 within the coverage area 8, and the feedback signal Sf, are making approximately equal contributions to the total power of the input signal Si, which would imply a high probability of oscillation. Accordingly, when the difference between the muted and un-muted power levels exceeds a predetermined threshold, the controller 32 determines that an oscillation condition is likely, and can reduce the uplink path gain by a predetermined amount (e.g. about 1 dB). The predetermined threshold can be based on any of a number of factors, including, for example, a likelihood of oscillation; a desired stability margin; and convergence of the gain to an optimum value. Similarly, the threshold may be expressed in various way, as desired. For example, the threshold could readily be expressed as a ratio (e.g. of about 0.5) between the un-muted and muted power levels.

Alternatively, if the un-muted and muted power levels are approximately equal, then the contribution of the feedback signal Sf to the total power of the input signal Si is negligible, and there is very little risk of oscillation. In this case, the controller 32 may adjust the AGC gain set signal 30 to increase the path gain by a predetermined amount, limited primarily by the maximum gain of the RF signal path 14. Thus, for example, if the (current) path gain is less than the maximum gain of the RF signal path 14, and the calculated difference is less than a second predetermined threshold value, then the controller unit can adjust to gain set signal 30 to increase the path gain by a desired amount (e.g. about 1 dB). The second threshold can be based on any of a number of factors, including, for example, a desired stability margin; an estimated variability of an RF environment in which the repeater 4 is located; and convergence of the path gain to an optimum value. Similarly, the second threshold may be expressed in various way, as desired and may or may not have a value equal to that of the first threshold discussed above.

As will be appreciated, periodically repeating the above process yields an iterative path gain optimization process, in which the controller 32 maximizes path gain while actively avoiding oscillation. It should be noted that periodic muting of the output signal So will unavoidably impact the quality of communication, which will be perceived by a subscriber as a reduction in voice communication quality and/or data throughput. However, the deleterious effects of such periodic muting can be minimised by selecting the frequency and duration of the mute period so as to limit the "duty cycle" to about 1% or less. This condition, can, for example, be satisfied by using a mute period frequency of 10 Hz, and duration of 1 mSec, which enables satisfactory oscillation detection and control with an acceptably low impact on the uplink voice quality and/or data throughput.

The above description relates to a "normal" operation mode, in which at least one mobile station 6 within the coverage area 8 of the repeater 4 is transmitting an uplink signal Se, so that the input signal Si contains uplink signal traffic from at least one mobile station 6. However, in practice there are significant periods of time during which no mobile stations are transmitting, so that there is no uplink signal Se. In this case, the power level of the input signal Si will be entirely due to (random) RFI and leakage signal Sf received by the input antenna 10.

This state (lack of an uplink signal Se) can be detected by the controller 32 during a mute period, in which the contribution of the leakage signal Sf to the power level of the input signal Si is eliminated. If no uplink signal Se is present, then the sampled "muted power level" will drop to a low level which is dominated by the known AGC noise. Accordingly, when the muted power level drops below a predetermined cut-off threshold (which may be based on an estimated amplifier noise of the RF signal path 14 and/or an estimated ambient RFI in the coverage area 8), the controller 32 can operate to hold the RF switch 34 open continuously, so as to prevent transmission of noise by the output antenna 12. This operation has the advantage of reducing both spurious RF signals (noise) received by the base station 2 and leakage signals within the repeater's coverage area 8. Both of these effects are beneficial to network performance.

In addition, opening the RF switch 34 in this manner automatically terminates any residual leakage signal Sf (and oscillation) remaining after the last mobile station 6 within the coverage area 8 ceases transmission. This allows the repeater 4 an opportunity to stabilize prior to the resumption of uplink signal transmission. In particular, when the last mobile station 6 ceases transmission, the controller 32 detects the loss of uplink signal Se (as described above), and opens the RF switch 34. This minimizes the power level of the input signal Si (by removing any leakage signal components), which would normally cause the AGC 16 to drive the VGA gain to a maximum. If desired, however, this AGC operation can be modified by the controller 32, for example by using the gain set signal 30 to force the VGA gain to a lower level in order to enable a "soft-start" operation when a mobile station 6 begins transmission of an uplink signal Se. In either case, the RF switch 34 remains open, so that changes in the VGA gain do not result in transmission of noise by the output antenna 12, and the "muted" power level detected by the controller 32 remains at a low level.

When a mobile station 6 within the coverage area 8 begins transmission of an uplink signal Se, the muted power level increases (above the threshold value). This change is detected by the controller 32, which closes the RF switch 34 and resumes normal VGA gain control (via the gain set signal 30) and oscillation detection and control as described above.

The embodiment(s) of the invention described above is(are) intended to be exemplary only. The scope of the invention is therefore intended to be limited solely by the scope of the appended claims.

We claim:

1. A method of detecting oscillation in an on-frequency repeater having an RF signal path coupled between an input antenna and an output antenna, the method comprising steps of:
    detecting a first RF signal power level within the RF signal path during an un-muted period in which transmission of an output RF signal through the output antenna is enabled;
    detecting a second RF signal power level within the RF signal path during a mute period in which transmission of an RF signal through the output antenna is disabled;
    comparing a difference between the first and second detected RF signal power levels to a predetermined threshold; and
    determining a likelihood of oscillation based on the comparison result.

2. A method as claimed in claim 1, wherein at least the step of detecting the second RF signal power level is repeated at a predetermined frequency, and wherein the duration of each mute period is selected to limit disruption of subscriber traffic.

3. A method as claimed in claim 2, wherein the frequency and duration are selected to yield a mute period duty cycle of 1% or less.

4. A method as claimed in claim 2, wherein the frequency is approximately 10 Hz and the duration is 1 mSec.

5. A method of controlling oscillation in an on-frequency repeater having an RF signal path coupled between an input antenna and an output antenna, the method comprising steps of:
    detecting a first RF signal power level within the RF signal path during an un-muted period in which transmission of an output RF signal through the output antenna is enabled;
    detecting a second RF signal power level within the RF signal path during a mute period in which transmission of an RF signal through the output antenna is disabled;
    comparing the first and second detected RF signal power levels; and
    adjusting oscillation in the repeater by adjusting a gain of the RF signal path based on the comparison result.

6. A method as claimed in claim 5, wherein at least the step of detecting the second RF signal power level is repeated at a predetermined frequency, and wherein the duration of each mute period is selected to limit disruption of subscriber traffic.

7. A method as claimed in claim 6, wherein the frequency and duration are selected to yield a mute period duty cycle of 1% or less.

8. A method as claimed in claim 6, wherein the frequency is 10 Hz and the duration is 1 mSec.

9. A method as claimed in claim 5, wherein the step of comparing the first and second detected RF signal power levels comprises a step of calculating a difference between the first and second detected RF signal power levels.

10. A method as claimed in claim 9, wherein the step of adjusting a gain of the RF signal path comprises a step of reducing gain of the RF signal path if the calculated difference is greater than a first predetermined threshold value.

11. A method as claimed in claim 10, wherein the first predetermined threshold value is selected based on any one or more of:
    a likelihood of oscillation;
    a desired stability margin; and
    convergence of the gain to an optimum value.

12. A method as claimed in claim 10, wherein the step of adjusting the gain of the RF signal path further comprises a step of increasing the gain of the RF signal path if the gain is less than a maximum gain of the RF signal path and the calculated difference is less than a second predetermined threshold value.

13. A method as claimed in claim 12, wherein the second threshold value is selected based on any one or more of:
    a desired stability margin;
    an estimated variability of an RF environment in which the repeater is located; and
    convergence of the gain to an optimum value.

14. A method as claimed in claim 12, wherein the first and second threshold values are equal.

15. A method as recited in claim 5, in which oscillation in the repeater is adjusted by:

comparing the difference between the first and second detected power levels to a predetermined value that corresponds to an absence of oscillation;

reducing the gain of the RF path if the difference between the first and second detected power levels is greater than the predetermined value; and repeating the comparing and reducing steps until the difference between the first and second detected power levels is less than the predetermined value.

* * * * *

UNITED STATES PATENT AND TRADEMARK OFFICE
CERTIFICATE OF CORRECTION

PATENT NO. : 7,593,689 B2  Page 1 of 1
APPLICATION NO. : 10/941869
DATED : September 22, 2009
INVENTOR(S) : Steve Allen et al.

It is certified that error appears in the above-identified patent and that said Letters Patent is hereby corrected as shown below:

Title Page:

Item (73), Assignee: add -- Kemptville (CA) -- as the Assignee's address.

Signed and Sealed this

First Day of June, 2010

David J. Kappos
*Director of the United States Patent and Trademark Office*